(No Model.)
J. BEGTRUP.
ENGINE CROSS HEAD.
No. 530,320. Patented Dec. 4, 1894.
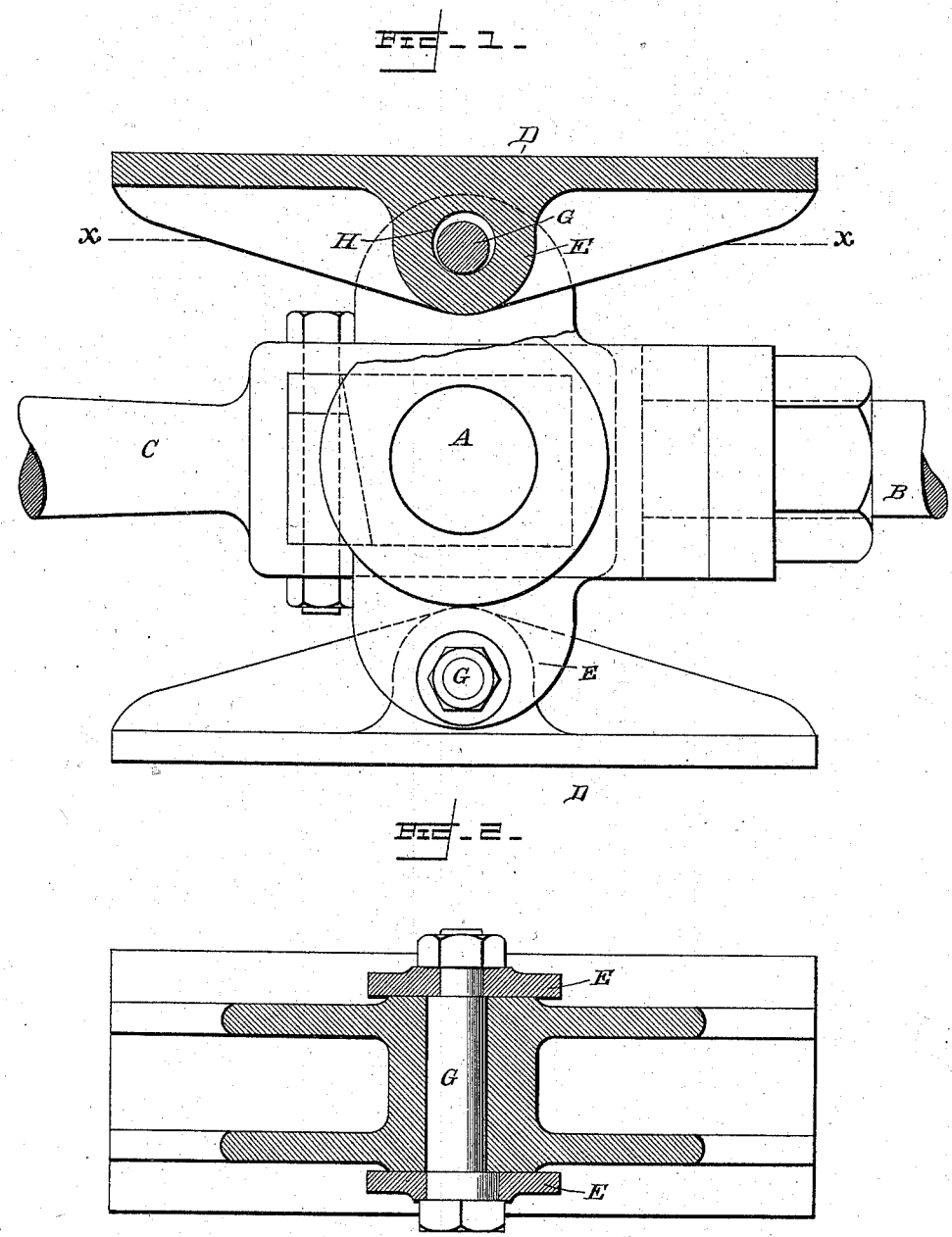

United States Patent Office.

JULIUS BEGTRUP, OF RIDGWAY, PENNSYLVANIA, ASSIGNOR TO JAMES H. McEWEN, OF SAME PLACE.

ENGINE CROSS-HEAD.

SPECIFICATION forming part of Letters Patent No. 530,320, dated December 4, 1894.

Application filed July 9, 1894. Serial No. 516,951. (No model.)

*To all whom it may concern:*

Be it known that I, JULIUS BEGTRUP, a subject of the King of Denmark, residing at Ridgway, in the county of Elk and State of Pennsylvania, have invented certain new and useful Improvements in Engine Cross-Heads; and I do declare the following to be a full, clear, and exact description of the invention, such as will enable others skilled in the art to which it appertains to make and use the same, reference being had to the letters of reference marked on the accompanying drawings, which form a part of this specification.

Figure 1 represents an elevation of an engine cross head, and connections broken away, with one of the shoes shown in section, embodying one form of my invention. Fig. 2 represents a section taken through the line X X of one of the shoes, showing a detail of the adjusting bolt.

The object of my invention is to provide a ready, simple and effective method of adjustment of the shoes of cross-heads.

For this purpose the improvements consist in the use of a rotatory or oscillating eccentric adjustment interposed between the cross-head and its shoes or bearings for the object above explained.

In the drawings—A represents a cross-head of any approved construction. B is a piston rod, and C, the pitman or connecting rod.

D are the shoes or bearings adapted to work in suitable ways (not shown).

E represents oppositely projecting ears having suitable bearings for an eccentric bolt G, which passes through the ears and through an opening G formed in the shoe. The shoes are adjustably set in and out from the cross-head by means of the eccentric bolt G being rotated to more or less extent, and then locked in that position by the lock-nuts upon said bolt, leaving the shoe free to oscillate upon the bolt.

In the cross-head shown in the present drawings each shoe is adjustably set by means of a single eccentric bolt, and the shoe has a rocking bearing adjustment in addition upon said bolt. I wish it understood however that, if desired, the shoe may not have a rocking bearing, and it may also be adjustably set by means of more than one bolt G for each shoe.

Instead of effecting the adjustment by means of the bolt G, I may substitute any form of rotary cam or eccentric, and any approved means for oscillating said cam, and locking it in any of its positions.

My invention may be applied also to cross-heads which have but one shoe, or which are multi-shoed.

My invention may also be applied to any cross-head where the same is applied in any of the mechanic arts.

The eccentric bolt G has two bearing surfaces that part of the bolt which extends into the adjustable shoe being eccentric to that part which enters the cross-head. The shoes are detachable, as will be apparent.

I claim—

1. An engine cross-head provided with a shoe or guide-block and a rotary eccentric for adjusting said shoe.

2. An engine cross-head provided with a rotary eccentric and a shoe or guide-block having a rocking bearing and an adjustment by said eccentric.

3. In combination with an engine cross-head having a guide-block or shoe, a pin or bolt connecting the guide-block with the body of the cross-head, and on said pin or bolt two or more bearing surfaces having their axes parallel but not in line.

4. An engine cross-head having detachable guide-blocks or shoes held in position by bolts or pins, each bolt having two or more parts with axes not coincident with each other.

5. In combination with adjustable guide blocks, an adjusting bolt arranged parallel to the bearing surface of the guide, and the different parts of said bolt eccentric in relation to each other.

6. In an engine cross-head having adjustable guide-shoes, a bolt extending through the cross-head and shoe, and parallel to the guide surface, that part of said bolt which extends into the adjustable shoe being eccentric to that part which extends into the cross-head.

JULIUS BEGTRUP.

Witnesses:
  A. L. BELL,
  E. H. HOBEL.